US011879235B2

(12) United States Patent
Serrurier et al.

(10) Patent No.: US 11,879,235 B2
(45) Date of Patent: Jan. 23, 2024

(54) TIP WITH THRU-HOLE AND PIN RETAINING GEOMETRY

(71) Applicant: Caterpillar Inc., Peoria, IL (US)

(72) Inventors: Douglas C. Serrurier, Morton, IL (US); Eric T. Sinn, Tremont, IL (US); Jason Grant Jura, Tremont, IL (US); Corey Michael Wells, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 182 days.

(21) Appl. No.: 17/464,838

(22) Filed: Sep. 2, 2021

(65) Prior Publication Data

US 2023/0064464 A1 Mar. 2, 2023

(51) Int. Cl.
*E02F 9/28* (2006.01)
(52) U.S. Cl.
CPC .......... *E02F 9/2841* (2013.01); *E02F 9/2833* (2013.01); *E02F 9/2858* (2013.01); *E02F 9/2825* (2013.01); *E02F 9/2875* (2013.01)
(58) Field of Classification Search
CPC ..... E02F 9/2841; E02F 9/2825; E02F 9/2833; E02F 9/2858
See application file for complete search history.

(56) References Cited

U.S. PATENT DOCUMENTS

| | | | | |
|---|---|---|---|---|
| 5,956,874 A | * | 9/1999 | Ianello | E02F 9/2825 37/456 |
| 5,987,787 A | * | 11/1999 | Mack | E02F 9/2825 37/456 |
| 6,092,958 A | * | 7/2000 | Gale | E02F 9/2833 37/456 |
| 6,477,796 B1 | | 11/2002 | Cornelius | |
| 7,762,015 B2 | * | 7/2010 | Smith | E02F 9/2858 37/455 |
| 8,495,826 B2 | | 7/2013 | Itou et al. | |
| 9,009,995 B2 | * | 4/2015 | Freund | E02F 9/2825 37/456 |
| 9,512,599 B2 | * | 12/2016 | Rol Corredor | E02F 9/2841 |
| 9,834,909 B2 | | 12/2017 | Guimaraes et al. | |
| 9,863,125 B2 | | 1/2018 | Attwood et al. | |
| 10,294,637 B2 | | 5/2019 | Perez Soria et al. | |
| 10,577,778 B2 | | 3/2020 | Quarfordt et al. | |
| 10,645,853 B2 | * | 5/2020 | Kovach | A01B 23/02 |
| 2016/0160474 A1 | | 6/2016 | Kunz | |
| 2016/0222634 A1 | | 8/2016 | Chiolerio et al. | |

* cited by examiner

*Primary Examiner* — Adam J Behrens
*Assistant Examiner* — Blake E Scoville (57) ABSTRACT

A wear member includes a forward working portion that is disposed along its longitudinal axis including a closed end, and a rear attachment portion that is disposed along the longitudinal axis including an open end with an exterior surface, and an interior surface. The interior surface defines an interior counterbore with a major diameter, and a minor diameter. A ratio of the major diameter to the minor diameter ranges from 1.8 to 2.2.

14 Claims, 9 Drawing Sheets

TIP WITH THRU-HOLE AND PIN RETAINING GEOMETRY

TECHNICAL FIELD

The present disclosure relates to retaining mechanisms employed on work implement assemblies such as bucket assemblies used by earth moving, mining, construction equipment and the like for attaching a tip to an adapter of the work implement assembly. More specifically, the present disclosure relates to a retaining mechanism that uses a retainer pin assembly to attached the tip to the adapter and a rail to foolproof the type of tip that can be attached to the adapter.

BACKGROUND

Machines such as wheel loaders, excavators, and the like employ work implement assemblies including bucket assemblies, rakes, shears, etc. that have teeth or tips attached to them to help perform work on a material such as dirt, rock, sand, etc. For example, teeth or tips may be attached to a bucket assembly to help the bucket assembly to penetrate the ground, facilitating the scooping of the dirt into a bucket. Adapters are often attached to the work edges (e.g. the base edge, the side edge, etc.) of the bucket or other work implement so that different styles of teeth or tips may be attached to the work implement. Also, the tips or teeth may be replaced easily when worn by providing a retaining mechanism that is used to selectively hold the tip onto the adapter or to allow the tip be removed from the adapter.

U.S. Pat. No. 3,740,876 A discloses a tooth for a bucket that includes a base and a changeable cap. Provided on the base is a lug which is cross-shaped in its cross-section. Opposite faces of the support side edges of the lug of the base are made parallel with respect to the longitudinal axis of the tooth along the whole length of the lug, i.e., the edges have one and the same thickness along their whole length. The lug of the base has a through opening and a hole accommodating a slide block and an elastic member. Made in the changeable cap coaxially to the opening is a through opening. Inserted into the coaxial openings is a pin fixing the position of the changeable cap on the lug of the base.

However, the retaining clip in the '876 patent does not provide an non-load bearing foolproof feature to limit the type of tip attached to an adapter.

Similarly, U.S. Pat. No. 5,956,874 A discloses a tooth point mounted on the nose of an adapter. The tooth point is removably secured to the adapter by a locking pin held in place by a keeper. Bosses are provided on the tooth point that slide into grooves found on the nose of the adapter.

However, the tooth point of the '874 patent may not work with adapters in the field that do not have grooves on the nose of the adapter.

SUMMARY OF THE DISCLOSURE

A tip assembly according to an embodiment of the present disclosure may comprise a tip with a body that defines a longitudinal axis, a vertical axis that is perpendicular to the longitudinal axis, and a lateral axis that is perpendicular to the longitudinal axis and the vertical axis. The body of the tip may include a forward working portion that is disposed along the longitudinal axis including a closed end, and a rear attachment portion that is disposed along the longitudinal axis including an open end with an exterior surface, and an interior surface. The interior surface may define an interior counterbore with a major diameter, and a minor diameter. A ratio of the major diameter to the minor diameter may ranges from 1.8 to 2.2.

A wear member according to an embodiment of the present disclosure may comprise a shell body defining a rear opening, forming an interior surface and including an exterior surface with a first ear, complementarily forming a rail receiving groove on the interior surface extending from the rear opening. A single hole may extend from the exterior surface through the first ear to the rail receiving groove, and defining a constant diameter.

A wear member according to another embodiment of the present disclosure may comprise a nose receiving portion defining a nose receiving pocket, and an exterior. An interior counterbore may extend through the nose receiving portion from the nose receiving pocket to the exterior. The interior counterbore defines a large retaining mechanism receiving cavity that is disposed adjacent to the nose receiving pocket, a small pin receiving hole that extends from the exterior to the large retaining mechanism receiving cavity, and a slot that extends from the exterior toward the large retaining mechanism receiving pocket.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

A work implement assembly using tips according to various embodiments of the present disclosure will now be discussed.

Figure 1:
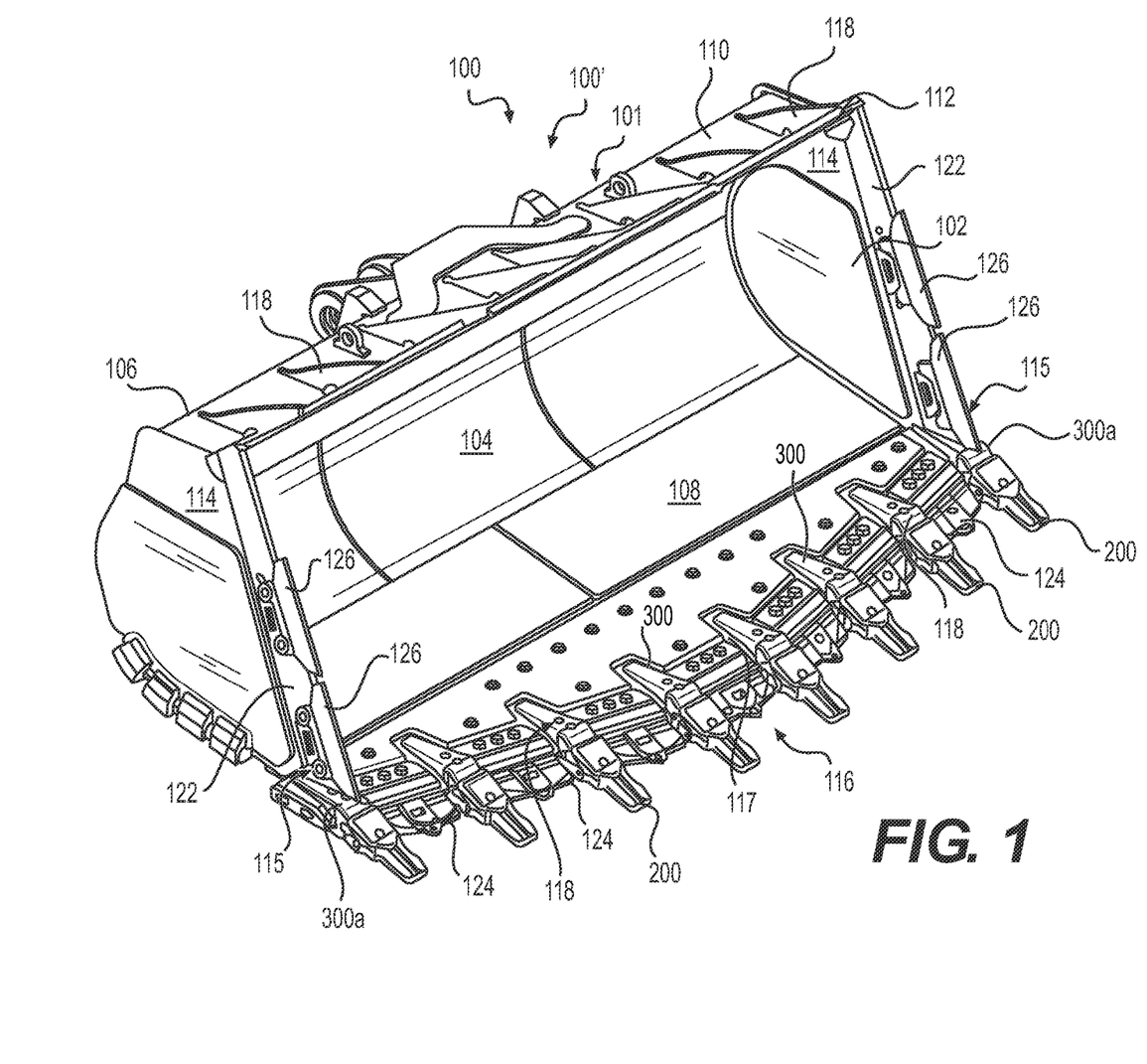
FIG. 1 is a perspective view of a work implement assembly such as a bucket assembly using tips, adapters, and retaining mechanisms with components configured according to various embodiments of the present disclosure.

Starting with FIG. 1, the work implement assembly 100 may take the form of a bucket assembly 100' that may be used by a wheel loader and that includes an enclosure 101 that defines an opening 102 that communicates with a generally enclosed interior. Starting from the rear of the bucket assembly 100 as shown in FIG. 1, the bucket assembly 100 includes a curved shell profile 104, which is attached to a rear wall 106 at the top end of the shell 104. The other end of the shell is attached to the bottom plate 108 of the assembly 100. A top plate 110 is attached to the top end of the rear wall 106. The top plate 110 transitions to a spill guard 112 that is designed to funnel material into the interior of the bucket and prevent material from spilling out of the bucket. Reinforcing ribs 118 are provided that are attached to the top plate 110 and the spill guard 112, providing reinforcement for strength. Two substantially flat end plates 114 are attached to the side edges of the spill guard 112, top plate 110, rear wall 106, bottom plate 108 and shell 104.

A side edge assembly 115 is attached to each end plate 114 while a front edge assembly 116 is attached to the front edge of the bottom plate 108 of the bucket assembly 100. The front edge assembly 116 includes a base edge 117 that is attached to the bottom plate 108, a plurality of tip and adapter assemblies 118 attached to the base edge 117, and a plurality of tips 200 (may also be referred to as tools, teeth, wear members, etc.) with each one of the plurality of tips 200 being attached to one of the plurality of center adapters 300. Also, two corner adapters 300a are also attached to the base edge and the side edges 122 of the bucket assembly 100'. Tip 200 may also be attached to the corner adapters 300a.

Moreover, a plurality of base edge protectors 124 are also provided with each one of the base edge protectors 124 positioned between center adapters 300 and between a center adapter 300 and a corner adapter 300a. A side edge protector 126 is also provided that is attached to the side edge 122 proximate to a corner adapter 300a.

It is to be understood that the work implement assembly may take other forms other than a bucket assembly including rake assemblies, shear assemblies, etc. In addition, a differently configured bucket that is meant to be used by an excavator may also use various embodiments of a tip, retaining mechanism, adapter, spring, sleeve, adapter assembly, and tip and adapter assembly, etc. as will be discussed herein.

Figure 2:
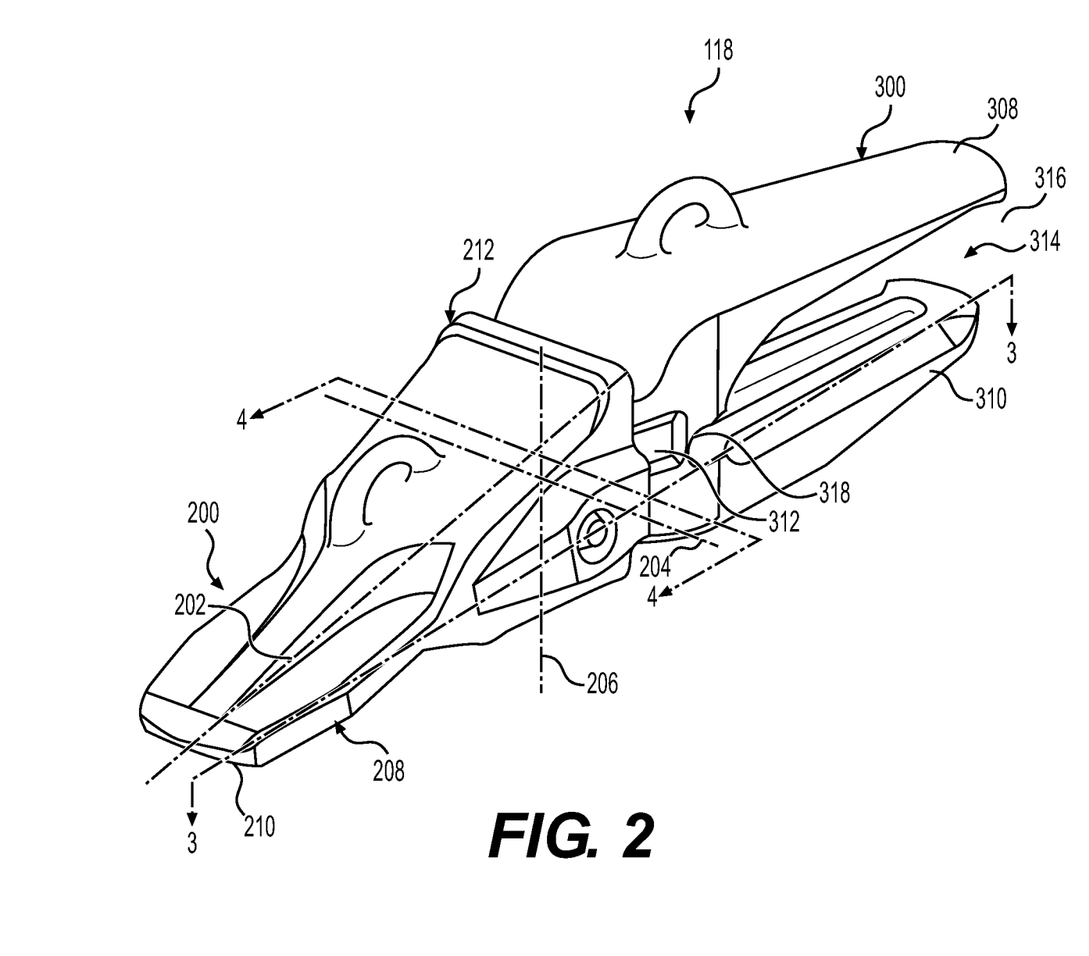
FIG. 2 is a perspective view of a tip and adapter assembly of FIG. 1, shown in isolation from the work implement assembly of FIG. 1.
Figure 3:
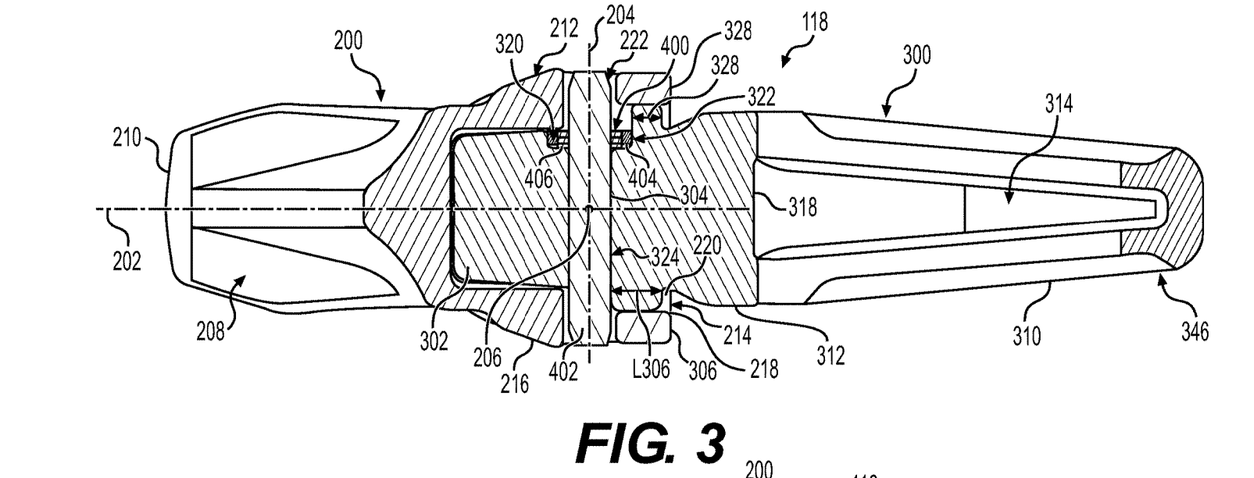
FIG. 3 is a top sectional view of the tip and adapter assembly of FIG. 2 taken along lines 3-3 thereof, showing a retaining mechanism and a pair rails adjacent to the retaining mechanism according to an embodiment of the present disclosure in a locked configuration.

Looking at FIGS. 2 and 3, a tip and adapter assembly 118 according to an embodiment of the present disclosure may comprise a tip 200 including a body that defines a longitudinal axis 202, a vertical axis 204 that is perpendicular to the longitudinal axis 202, and a lateral axis 206 that is perpendicular to the vertical axis 204, and the longitudinal axis 202. The tip may include a forward working portion 208 disposed along the longitudinal axis 202 including a closed end 210 (may not always be necessary), and a rear attachment portion 212 disposed along the longitudinal axis 202 including an open end 214 with an exterior surface 216, and an interior surface 218.

It is to be understood that the tip and adapter are designed to mate with each other, and therefore may share the same longitudinal axis, lateral axis, and vertical axis.

Figure 4:
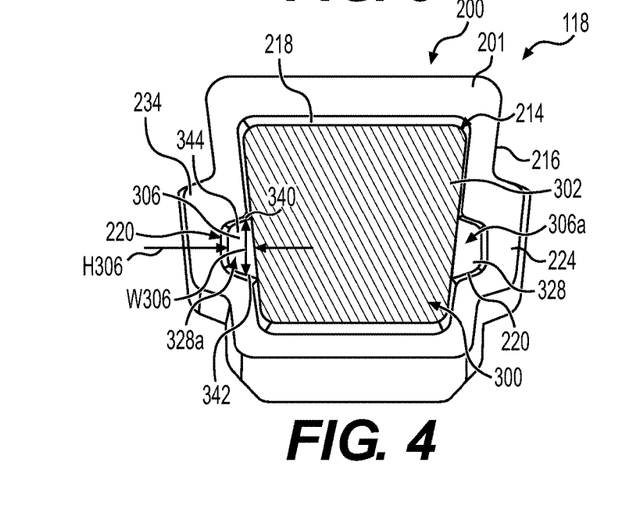
FIG. 4 is a rear sectional view of the tip and adapter assembly of FIG. 2 taken along lines 4-4 thereof.

Focusing on FIGS. 3 and 4, the assembly 118 may also include an adapter (e.g., a center adapter 300 is shown in detail but a corner adapter 300a as shown in FIG. 1 may be similarly constructed) including a body that has a nose portion 302 defining an aperture 304, and including a first rail 306 disposed adjacent the aperture 304 along the longitudinal axis 202 (may be disposed rearwardly of the aperture as shown, or forwardly, etc.). The first rail 306 may extend laterally, and vertically from the nose portion 302. At the same time, and the interior surface 218 of the tip 200 defines a rail receiving groove 220 with the first rail 306 disposed in the rail receiving groove 220. Two such grooves may be provided to receive two rails as shown, but not necessarily so. The tip 200 may further define a hole 222 that is aligned with the aperture 304 of the adapter 300 (e.g., collinear, concentric, etc.) for receiving a retaining mechanism 400 as will be described in more detail momentarily.

In FIG. 2, the adapter 300 may be provided with mounting structure such as a first leg 308, a second leg 310, and a throat portion 312 that connects the first leg 308 to the second leg 310, forming a slot 314 with an open end 316, and a closed end 318. Hence, the adapter may be attached to a lip or other edge of a work implement by sliding the legs over the edge so that the legs straddle the edge (thus defining a longitudinal axis, etc.). A retaining mechanism or welding, etc. may be used to hold the adapter onto the edge. Other types of mounting structure may be employed in other embodiments of the present disclosure.

Referring back to FIG. 3, the hole 222 of the tip, and the aperture 304 of the adapter may form a passage that extends laterally completely through the assembly 118, allowing a retaining pin 402 to pass completely through the assembly. This may not be the case for other embodiments of the present disclosure.

More specifically, the aperture 304 of the adapter 300 may take the form of a counterbore 320 (see also FIG. 6) with a large diameter portion 322, and a small diameter portion 324 that is in communication with the hole 222 of the tip 200. The retaining mechanism 400 may include a sleeve 404, and a spring 406 that are disposed in the counterbore 320. The spring 406 may be a coil washer type spring member that expands, allowing the pin to pass through until the spring falls into a notch on the side of the pin (and/or via friction), holding the pin in place against unintentional displacement. Other retaining mechanisms may be employed, etc.

Put another way, the pin 402 may engage the spring, being disposed in the large diameter portion 322 of the counterbore, the small diameter portion 324 of the counterbore, and the hole 222 of tip 200 simultaneously. Now, the tip cannot be pulled longitudinally off the adapter.

Figure 5:
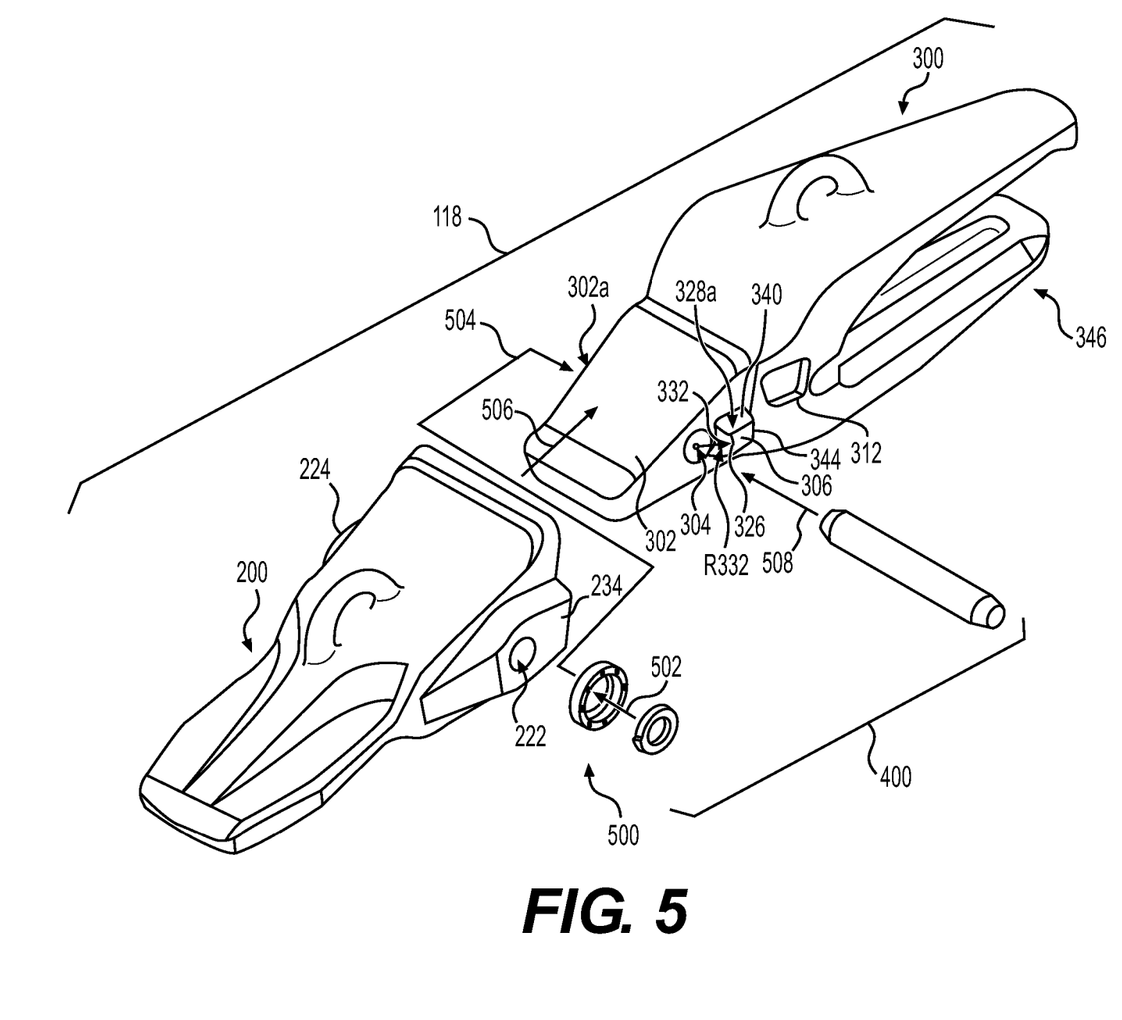
FIG. 5 is an exploded assembly view of the tip and adapter assembly of FIG. 2.

Turning now to FIGS. 3 thru 5, the first rail 306 may be disposed longitudinally adjacent to the aperture 304 of the adapter 300, forming a surface of revolution 326 (e.g., a conical or cylindrical surface, etc.) that is longitudinally adjacent to the aperture 304. Also, the first rail 306 may be interposed longitudinally between the aperture 304, and a throat portion 312 of the adapter 300.

In FIGS. 3 and 4, it can be seen that the first rail 306 may define a vertical width W306, a lateral height H306 that is less than the vertical width, and a longitudinal length L306 that is greater than the vertical width.

Figures 6, 7:
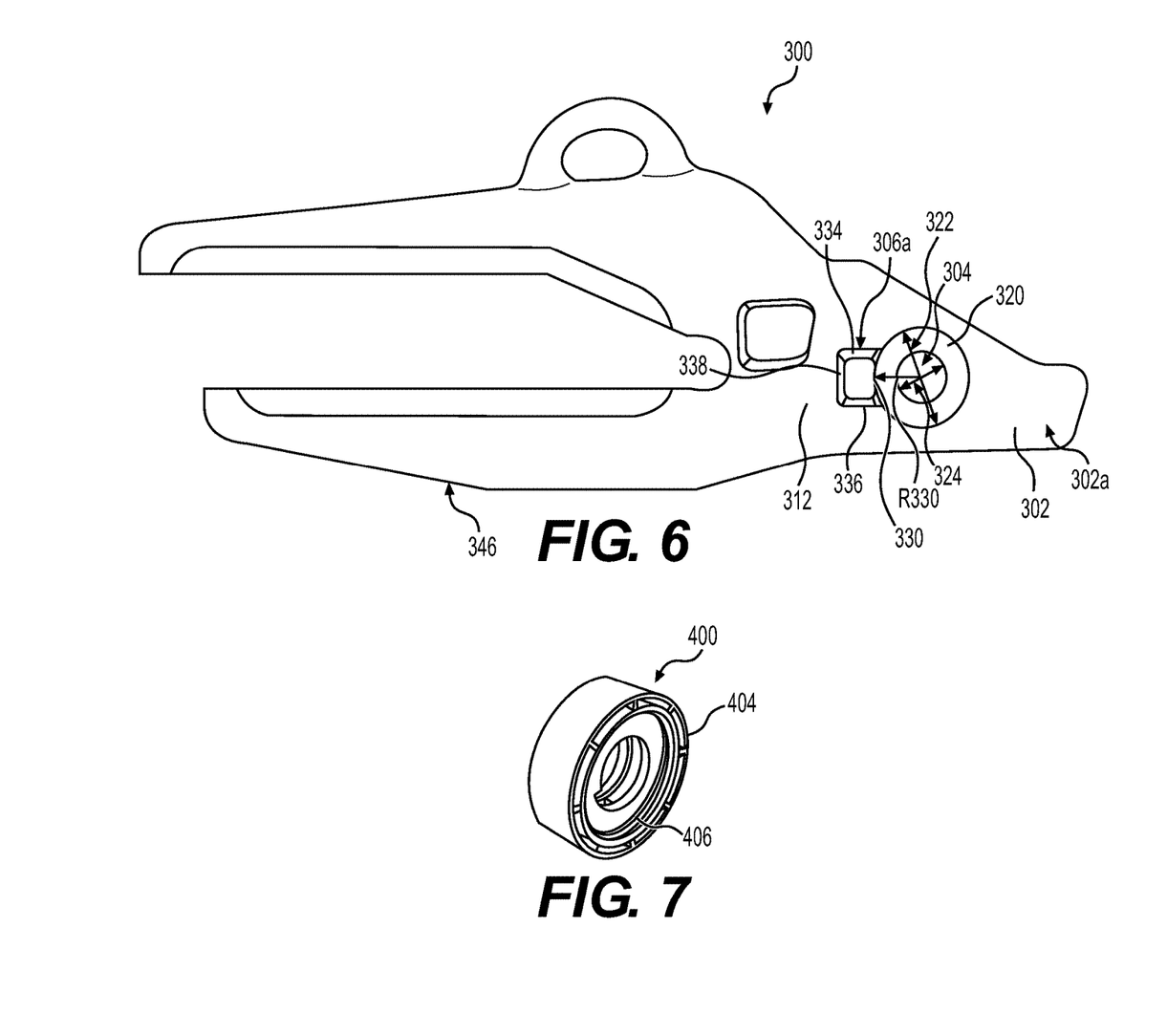
FIG. 6 is a side view of the adapter of FIG. 2 shown in isolation, revealing the counterbore that receives the retaining mechanism including the outer sleeve and the coil washer spring.
FIG. 7 depicts the outer sleeve and the coil washer spring assembled before being inserted into the counterbore of FIG. 6.

As seen in FIGS. 3 and 6, a second rail 328 may be provided that partially defines the counterbore 320, decreasing the longitudinal length L328 of the second rail 328 as compared to the longitudinal length L306 of the first rail 306. The width and the height may be the same.

A wear member that may be used to repair or retrofit an assembly similar or identical to assembly 118 will now be described with reference to FIGS. 4 and 5. The wear member (e.g., may take the form of tip 200, etc.) may comprise a shell body 201 defining a rear opening (e.g., see open end 214), forming an interior surface 218, and including an exterior surface 216 with a first ear 224 (two such ears may be provided, but not necessarily so), complementarily forming a rail receiving groove 220 (two such grooves may be provided but no necessarily so) on the interior surface 218 extending from the rear opening. A single hole 222 may extend through the first ear 224 to the rail receiving groove 220. As shown, the single hole 222 may maintain a constant diameter 226 (i.e. less than a 10% variance). This may not be the case for other embodiments of the present disclosure.

Next, a base member that may be used to repair or retrofit an assembly similar or identical to assembly 118 will now be described with reference to FIGS. 5 and 6.

Such a base (e.g., may take the form of adapter 300) may comprise a male portion 302a including a first projection 306a, and a second projection 328a facing in a diametrically opposed manner to the first projection 306a, as well as a stepped bore (e.g. may take the form of counterbore 320) that extends from the first projection 306a to the second projection 328a. As alluded to earlier herein, the stepped bore may include a large diameter portion 322 that is at least partially formed by the first projection 306a.

With continued reference to FIGS. 5 and 6, the first projection 306a may define a first concave arcuate surface 330 with a first radius of curvature R330, and the second projection 328a may define a second concave arcuate surface 332 with a second radius of curvature R332 that is less than the first radius of curvature R330 (or vice versa, meaning one rail is differently configured than the other rail having different radii of curvature). More specifically, a ratio of the first radius of curvature to the second radius of curvature may range from 1.72 to 2.08 in some embodiments of the present disclosure.

As best seen in FIG. 6, the first projection 306a may include a top planar surface 334, a bottom planar surface 336, and a rear planar surface 338 that is diametrically opposed or on the opposite side as compared to the first concave arcuate surface 330. Other configurations are possible.

Similarly, as best seen in FIGS. 4 and 5, the second projection 328a may include an upper planar surface 340, a lower planar surface 342, and a back planar surface 344 that is diametrically opposed or on the opposite side as compared to the second concave arcuate surface 332. Other configurations are possible in other embodiments of the present disclosure.

Referring once more to FIGS. 3, 5, and 6, the base may further comprise a female portion 346 (e.g., formed by the legs), and the first projection 306a, and the second projection 328a may be positioned between the stepped bore (e.g., counterbore 320), and the female portion 346. This may not be the case for other embodiments of the present disclosure (e.g., the projections may be in front of the stepped bore, etc.).

In FIG. 3, a retaining mechanism 400 may be disposed in the large diameter portion 322 of the stepped bore. More particularly, the sleeve 404 and the spring 406 are disposed in the counterbore 320. Also, the stepped bore also defines a small diameter portion 324 that extends from the large diameter portion 322 completely through the male portion 302a. This may not be the case in other embodiments of the present disclosure.

As a result of this structure, the pin 402 may be inserted into the stepped bore until it engages the spring (e.g., via a notch on its circumferential surface, via friction on its circumferential surface, etc.). To remove the pin, a tool may be placed on its end and tapped with a hammer until the pin moves out of the stepped bore. Now, the wear member may be removed from the base.

A tip and adapter assembly 118a similar to that of FIGS. 1 thru 7, will now be described with reference to FIGS. 8 thru 12. The main difference between assemblies 118, 118a is the counterbore for holding the retaining mechanism is placed in the tip for 118a instead of the adapter.

Figure 8:
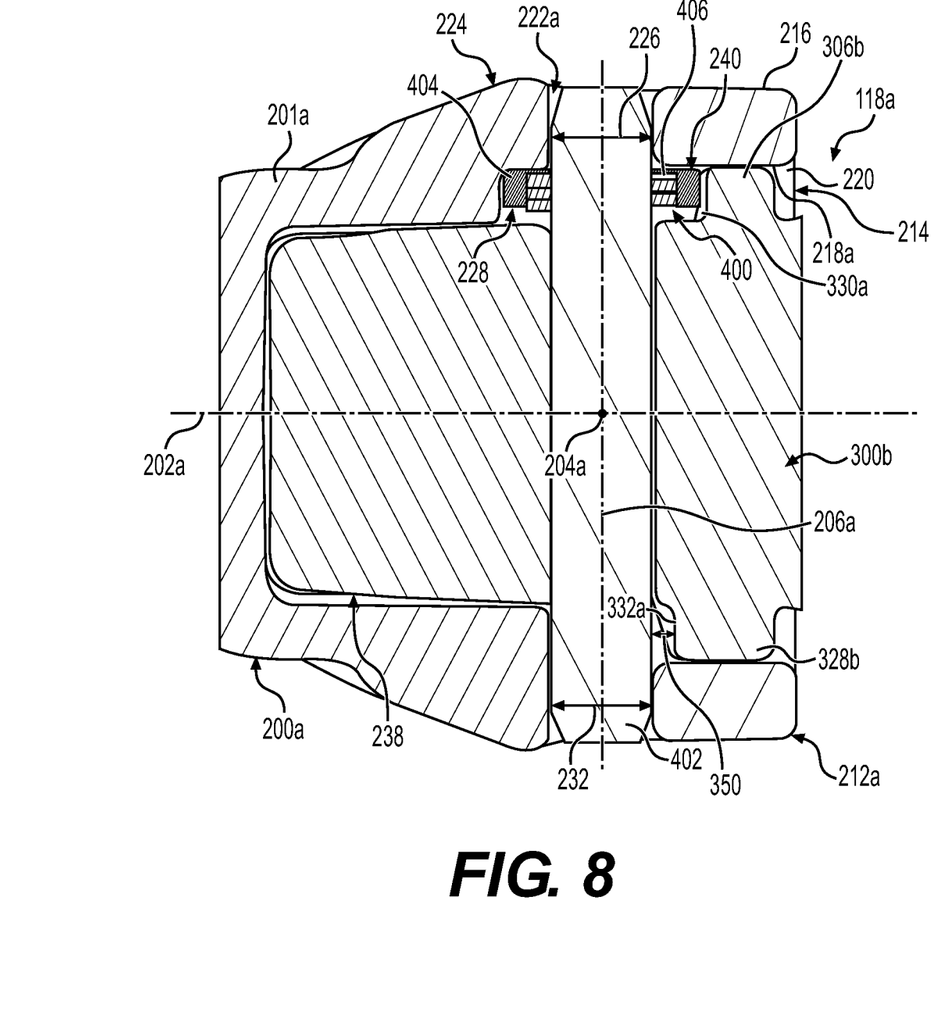
FIG. 8 is a partial sectional view of a tip and adapter assembly according to another embodiment of the present disclosure where the sleeve and spring of the retaining mechanism is held in place in an interior pocket of the tip.

For example, the adapter 300b shown in FIG. 8 is similarly constructed as the adapter 300 described earlier herein including having rails 306b, 328b or projections that are differently configured from each other and have similar shapes and sizes as those described earlier herein except that extra clearance 350 has been provided between the pin/retaining mechanism and the arcuate surfaces 330a, 332a. So, the ratio of their radii of curvature may still fall within the range described earlier herein. However, the counterbore is not present in the adapter 300b.

Figure 11:
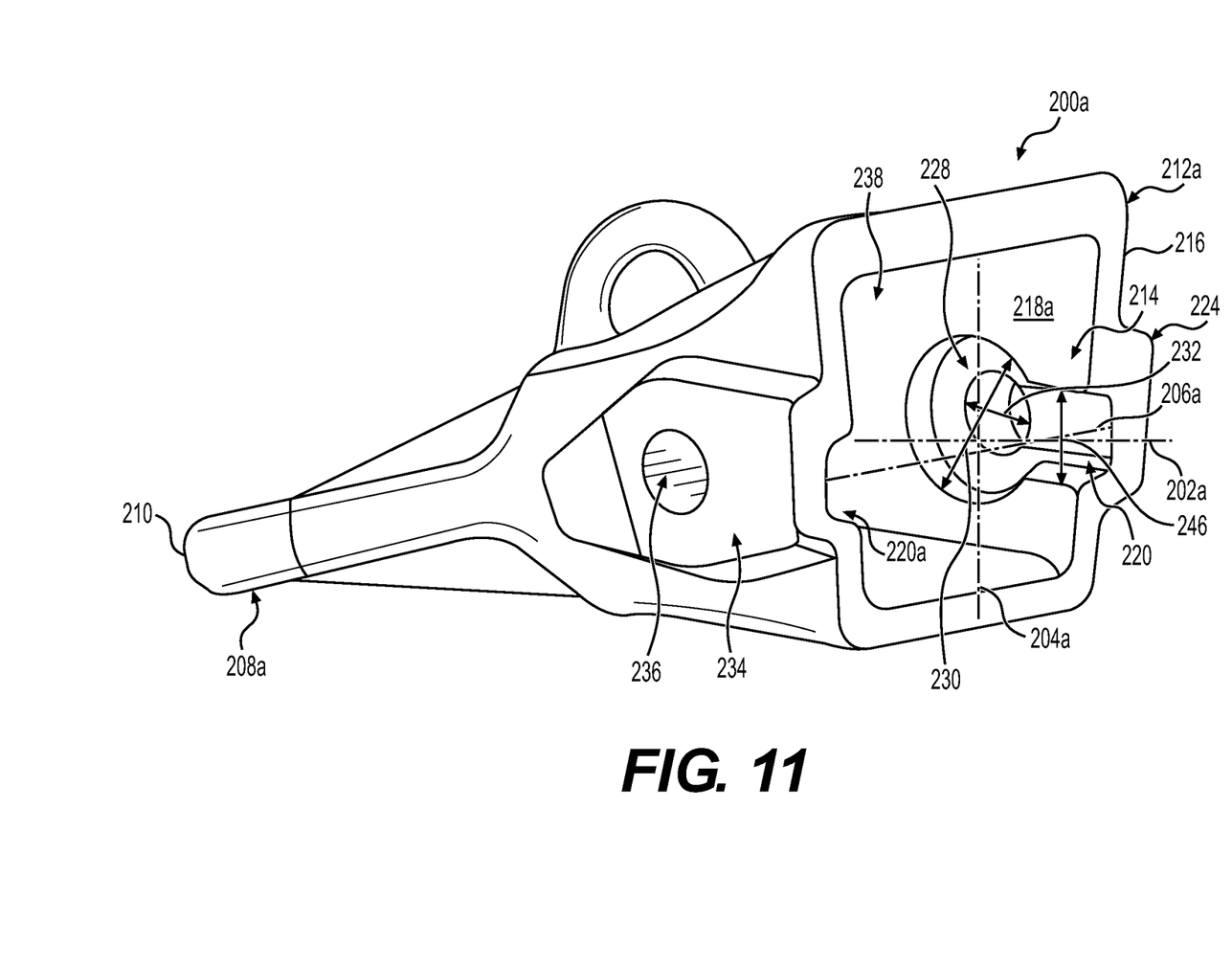
FIG. 11 is a rear oriented perspective view of the tip of FIG. 9 with the retaining mechanism removed, showing the pocket more clearly.
Figure 12:
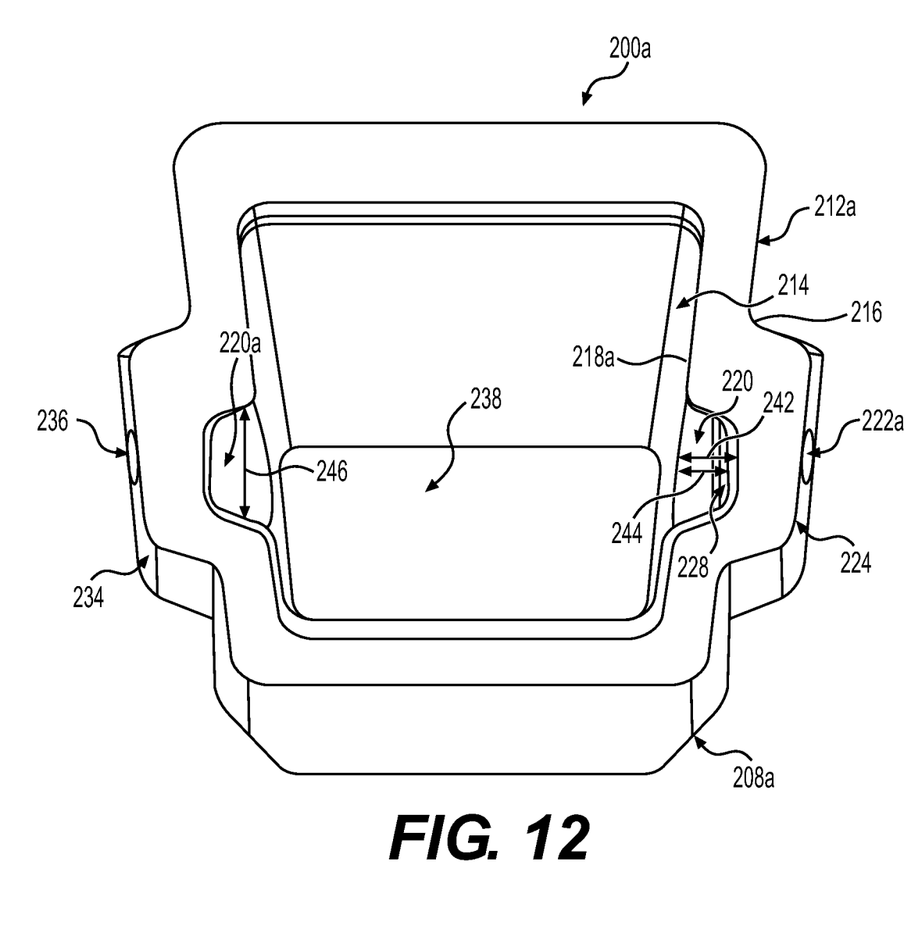
FIG. 12 is a rear view of the tip of FIG. 11.

Focusing now on the tip 200a as shown in FIGS. 11 and 12, it may have a body that defines a longitudinal axis 202a, a vertical axis 204a that is perpendicular to the longitudinal axis 202a, and a lateral axis 206a that is perpendicular to the longitudinal axis and the vertical axis. The body may include a forward working portion 208a that is disposed along the longitudinal axis 202a including a closed end 210, and a rear attachment portion 212a that is disposed along the longitudinal axis including an open end 214 with an exterior surface 216, and an interior surface 218a.

As best seen in FIG. 11, the interior surface 218a may define an interior counterbore 228 with a major diameter 230, and a minor diameter 232. A ratio of the major diameter to the minor diameter may range from 1.8 to 2.2. Also, the minor 232 diameter may extend laterally completely through the tip, but not necessarily so.

Figures 9, 10:
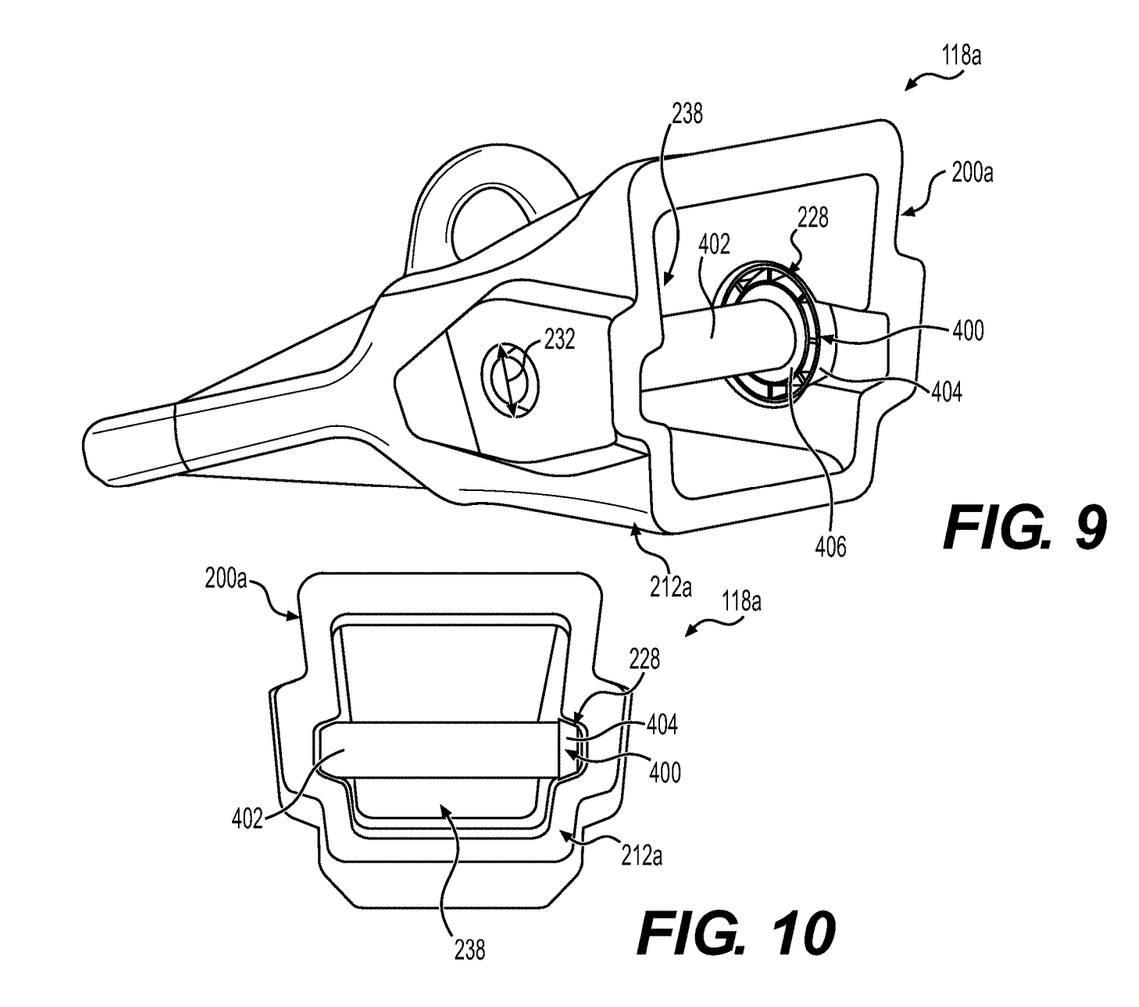
FIG. 9 is a rear oriented perspective view of the tip and the retaining mechanism of FIG. 8 with the adapter removed, allowing the pocket holding the sleeve and spring to be seen more clearly.
FIG. 10 is a rear view of the tip and the retaining mechanism of FIG. 9.

As shown in FIGS. 8 and 9, a retaining mechanism 400 may be is disposed in the interior counterbore 228 that includes a sleeve 404, and a spring 406 that is disposed in the interior counterbore 228 in a manner described elsewhere herein. In addition, a pin 402 may be disposed in the minor diameter 232 of the interior counterbore 228, and that engages the spring 406 in a manner described elsewhere herein.

Referring again to FIG. 11, the exterior surface 216 of the tip 200a may define a first ear 224, and the minor diameter 232 of the interior counterbore 228, may extend through the first ear 224. Also, the exterior surface 216 of the tip 200a may define a second ear 234, and another thru-hole 236 that is coextensive with the minor diameter 232 of the interior counterbore 228. Put another way, the minor diameter 232 may be constant (i.e., less than a 10% variance). This may not be the case for other embodiments of the present disclosure.

Looking solely from the exterior of the tip 200a (and also tip 200), it may be characterized in that the exterior surface 216 defines a single aperture (e.g., hole 222, 222a) that extends through the first ear, and another single aperture (e.g., thru-hole 236) that extends through the second ear 234. Both single apertures may be coextensive, etc.

Next, a wear member (e.g. tip 200, 200a) that may be supplied as a replacement part or as a retrofit in the field will be discussed with reference to FIGS. 3, 8 and 11.

The wear member may comprise a shell body 201, 201a defining a rear opening (e.g., open end 214), forming an interior surface 218, 218a, and including an exterior surface 216 with a first ear 224, complementarily forming a rail receiving groove 220 on the interior surface extending from the rear opening. A single hole 222, 222a may extend from the exterior surface 216 through the first ear 224 to the rail receiving groove 220, and defining a constant diameter 226.

Looking at FIGS. 3, 4 and 12, the exterior surface 216 defines a second ear 234, complimentarily forming another rail receiving groove 220a on the interior surface 218, 218a extending from the rear open end.

In FIG. 11, the interior surface 218a defines a counterbore (e.g., see 228) that is communication with the single hole 222 of the first ear 224 defining another constant diameter (e.g., may take the form of major diameter 230). A ratio of the constant diameter 230 of the counterbore to the constant diameter 226 of the single hole may range from 1.8 to 2.2.

A wear member according to another embodiment of the present disclosure may be described with reference to FIGS. 8 thru 12. The wear member (e.g., tip 200a) may comprise a nose receiving portion (e.g., may take the form of a rear attachment portion 212a) defining a nose receiving pocket 238, and an exterior (e.g., see exterior surface 216). An interior counterbore 228 may extend through the nose receiving portion from the nose receiving pocket 238 to the exterior surface 216. The interior counterbore 228 defines a large retaining mechanism receiving cavity 240 (see FIG. 8, large in the sense it is bigger than the small pin receiving hole 222a) that is disposed adjacent to the nose receiving pocket 238, and a small pin receiving hole 222a (see FIG. 8) that extends from the exterior to the large retaining mechanism receiving cavity 240.

Also, a slot (e.g., may take the form of a rail receiving groove 220) that extends from the exterior toward the large retaining mechanism receiving pocket 240. As shown in FIGS. 8 and 11, the slot may extend completely to the large retaining mechanism receiving cavity 240, but not necessarily so. Thus, the slot, the counterbore, and the nose receiving pocket are all in communication with each other.

As best seen in FIG. 12, the slot may define a slot depth 242 (measured laterally), while the large retaining mechanism receiving cavity 240 defines a cavity depth 244 that is less than the slot depth 242. This may not be the case in other embodiments of the present disclosure.

Moreover, the slot may define a slot width 246 (measured vertically), and the large retaining mechanism receiving cavity 240 defines a diameter (e.g., major diameter 230 in FIG. 11) that is greater than the slot width 246. Again, this may not be the case in other embodiments of the present disclosure. The retaining mechanism 400 (e.g., the sleeve 404, and the spring 406) may be disposed in the large retaining mechanism receiving cavity 240.

Again, it should be noted that any of the dimensions, angles, surface areas and/or configurations of various features may be varied as desired or needed including those not specifically mentioned herein. Although not specifically discussed, blends such as fillets are shown to connect the various surfaces. These may be omitted in other embodiments and it is to be understood that their presence may be ignored sometimes when reading the present specification unless specifically mentioned.

Industrial Applicability

In practice, a machine, a work implement assembly, a tip, a wear member, an adapter, a base member, an adapter assembly, a tip and adapter assembly, a retaining mechanism, and/or any combination of these various assemblies and components may be manufactured, bought, or sold to retrofit a machine or a work implement assembly in the field in an aftermarket context, or alternatively, may be manufactured, bought, sold or otherwise obtained in an OEM (original equipment manufacturer) context.

Any of the aforementioned components may be made from any suitable material including iron, grey-cast iron, steel, spring steel, plastic, rubber, foam, etc.

The aforementioned tip and adapter assembly, etc. as shown in FIGS. 1 thru 4 may be assembled using method 500 as illustrated in FIG. 5. First, the spring may be inserted (e.g., snapped into or screwed into) the sleeve (see step 502). Second, this subassembly (as shown for example in FIG. 7) is inserted into the counterbore (see step 504). Then, the tip is slid onto the adapter (step 506). After that, the pin is placed into the counterbore from either side, and tapped with a hammer until the pin engages the spring as alluded to earlier herein (step 508). Now, the tip is secured to the adapter. Disassembly may be achieved by reversing one or more of these steps.

For the tip and adapter assembly shown in FIGS. 8 thru 12, the assembly process is substantially the same except the sleeve/spring subassembly would be inserted into the counterbore of the tip. Then, disassembly would be achieved by reversing one or more steps of assembly.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A tip assembly comprising:
    a tip with a body that defines a longitudinal axis, a vertical axis that is perpendicular to the longitudinal axis, and a lateral axis that is perpendicular to the longitudinal axis and the vertical axis, the tip including:
        a forward working portion that is disposed along the longitudinal axis including a closed end; and
        a rear attachment portion that is disposed along the longitudinal axis including an open end with an exterior surface, and an interior surface,
    wherein the exterior surface of the tip defines a first ear, the interior surface of the tip defines an interior counterbore with a major diameter, and a minor diameter that extends through the first ear, and a ratio of the major diameter to the minor diameter ranges from 1.8 to 2.2, and
    wherein the exterior surface of the tip defines a second ear, including a thru-hole having a constant diameter extending from the interior surface of the tip to the exterior surface of the tip.

2. The tip assembly of claim 1, wherein the minor diameter extends laterally completely through the tip.

3. The tip assembly of claim 1, further comprising a retaining mechanism that is disposed in the interior counterbore.

4. The tip assembly of claim 3, wherein the retaining mechanism includes a sleeve and a spring that is disposed in the interior counterbore.

5. The tip assembly of claim 4, further comprising a pin that is disposed in the minor diameter of the interior counterbore, and that engages the spring.

6. The tip assembly of claim 1, wherein the thru-hole in the second ear is coextensive with the minor diameter of the interior counterbore.

7. The tip assembly of claim 6, wherein the minor diameter is constant.

8. A wear member comprising:
    a shell body defining a rear opening forming an interior surface, the shell body including:
        an exterior surface;
        a first ear protruding laterally outward from the exterior surface;
        a rail receiving groove on the interior surface extending from the rear opening; and
        a single hole extending from the exterior surface through the first ear to the rail receiving groove, and defining a constant diameter.

9. The wear member of claim 8, wherein the shell body further includes:
    a second ear protruding laterally outward from the exterior surface; and
    another rail receiving groove on the interior surface extending from the rear opening.

10. The wear member of claim 8, wherein the interior surface defines a counterbore that is in communication with the single hole of the first ear defining another constant diameter.

11. The wear member of claim 10, wherein a ratio of the constant diameter of the counterbore to the constant diameter of the single hole ranges from 1.8 to 2.2.

12. The wear member of claim 8, wherein the rail receiving groove has a maximum width at the interior surface.

13. The wear member of claim 9, the single hole is a first single hole and the shell body further includes a second single hole extending from the exterior surface through the second ear to the rail receiving groove, and defining a constant diameter.

14. The wear member of claim 13, wherein the first single hole is aligned with the second single hole.

* * * * *